United States Patent
Blasingame et al.

(10) Patent No.: US 7,298,942 B2
(45) Date of Patent: Nov. 20, 2007

(54) PLUGGABLE OPTICAL OPTIC SYSTEM HAVING A LENS FIBER STOP

(75) Inventors: Raymond W. Blasingame, Richardson, TX (US); Bo Su Chen, Plano, TX (US); James C. Lee, Plymouth, MN (US); James D. Orenstein, Duncanville, TX (US); James K. Guenter, Garland, TX (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/456,123

(22) Filed: Jun. 6, 2003

(65) Prior Publication Data

US 2004/0247242 A1 Dec. 9, 2004

(51) Int. Cl.
 *G02B 6/32* (2006.01)
(52) U.S. Cl. .......................................... 385/35; 385/33
(58) Field of Classification Search .................. 385/35, 385/88–94
 See application file for complete search history.

(56) References Cited

U.S. PATENT DOCUMENTS

| | | | |
|---|---|---|---|
| 4,317,085 A | 2/1982 | Burnham et al. | |
| 4,466,694 A | 8/1984 | MacDonald | |
| 4,660,207 A | 4/1987 | Svilans | |
| 4,675,058 A | 6/1987 | Plaster | |
| 4,705,351 A * | 11/1987 | Toda ........................... | 385/74 |
| 4,784,722 A | 11/1988 | Liau et al. | |
| 4,885,592 A | 12/1989 | Kofol et al. | |
| 4,901,327 A | 2/1990 | Bradley | |
| 4,943,970 A | 7/1990 | Bradley | |
| 4,956,844 A | 9/1990 | Goodhue et al. | |
| 4,979,791 A * | 12/1990 | Bowen et al. ................ | 385/33 |
| 5,031,187 A | 7/1991 | Orenstein et al. | |
| 5,052,016 A | 9/1991 | Mahbobzadeh | |
| 5,056,098 A | 10/1991 | Anthony et al. | |
| 5,062,115 A | 10/1991 | Thornton | |
| 5,068,869 A | 11/1991 | Wang et al. | |
| 5,079,774 A | 1/1992 | Mendez et al. | |
| 5,115,442 A | 5/1992 | Lee et al. | |

(Continued)

FOREIGN PATENT DOCUMENTS

DE 4240706 A1 6/1994

(Continued)

OTHER PUBLICATIONS

Banwell et al., "VCSE Laser Transitters for Parallel Data Links", *IEEE Journal of Quantum Electronics*, vol. 29, No. 2, Feb. 1993, pp. 635-644.

(Continued)

*Primary Examiner*—Sung Pak
(74) *Attorney, Agent, or Firm*—Workman Nydegger (57) ABSTRACT

An optical coupler having two refractive lenses for coupling an optoelectronic element and an optical medium to each other. One lens may be in contact with the optical medium. The refractive index of the one lens may be similar to the index of the optical medium. The optoelectronic element may be a light source or a detector. The light source may be a laser. The lenses may be glass ball lenses. One of the ball lenses may be a half ball lens. If the optical medium is an optical fiber, one of the lenses may a fiber stop for the fiber when inserted in a receptacle of the coupler.

38 Claims, 5 Drawing Sheets

U.S. PATENT DOCUMENTS

| | | | |
|---|---|---|---|
| 5,117,469 A | 5/1992 | Cheung et al. | |
| 5,140,605 A | 8/1992 | Paoli et al. | |
| 5,157,537 A | 10/1992 | Rosenblatt et al. | |
| 5,158,908 A | 10/1992 | Blonder et al. | |
| 5,175,783 A * | 12/1992 | Tatoh | 385/93 |
| 5,212,706 A | 5/1993 | Jain | |
| 5,216,263 A | 6/1993 | Paoli | |
| 5,216,680 A | 6/1993 | Magnusson et al. | |
| 5,237,581 A | 8/1993 | Asada et al. | |
| 5,245,622 A | 9/1993 | Jewell et al. | |
| 5,258,990 A | 11/1993 | Olbright et al. | |
| 5,262,360 A | 11/1993 | Holonyak, Jr. et al. | |
| 5,285,466 A | 2/1994 | Tabatabaie | |
| 5,293,392 A | 3/1994 | Shieh et al. | |
| 5,317,170 A | 5/1994 | Paoli | |
| 5,317,587 A | 5/1994 | Ackley et al. | |
| 5,325,386 A | 6/1994 | Jewell et al. | |
| 5,331,654 A | 7/1994 | Jewell et al. | |
| 5,337,074 A | 8/1994 | Thornton | |
| 5,337,183 A | 8/1994 | Rosenblatt et al. | |
| 5,349,599 A | 9/1994 | Larkins | |
| 5,351,256 A | 9/1994 | Schneider et al. | |
| 5,351,330 A * | 9/1994 | Jongewaard | 385/93 |
| 5,359,447 A | 10/1994 | Hahn et al. | |
| 5,359,618 A | 10/1994 | Lebby et al. | |
| 5,363,397 A | 11/1994 | Collins et al. | |
| 5,373,520 A | 12/1994 | Shoji et al. | |
| 5,373,522 A | 12/1994 | Holonyak, Jr. et al. | |
| 5,376,580 A | 12/1994 | Kish et al. | |
| 5,381,495 A * | 1/1995 | Hu | 385/51 |
| 5,386,426 A | 1/1995 | Stephens | |
| 5,390,209 A | 2/1995 | Vakhshoori | |
| 5,396,508 A | 3/1995 | Bour et al. | |
| 5,404,373 A | 4/1995 | Cheng | |
| 5,412,678 A | 5/1995 | Treat et al. | |
| 5,412,680 A | 5/1995 | Swirhun et al. | |
| 5,416,044 A | 5/1995 | Chino et al. | |
| 5,428,634 A | 6/1995 | Bryan et al. | |
| 5,438,584 A | 8/1995 | Paoli et al. | |
| 5,446,754 A | 8/1995 | Jewell et al. | |
| 5,465,263 A | 11/1995 | Bour et al. | |
| 5,475,701 A | 12/1995 | Hibbs-Brenner | |
| 5,493,577 A | 2/1996 | Choquette et al. | |
| 5,497,390 A | 3/1996 | Tanaka et al. | |
| 5,513,202 A | 4/1996 | Kobayashi et al. | |
| 5,530,715 A | 6/1996 | Shieh et al. | |
| 5,533,159 A * | 7/1996 | Okochi et al. | 385/93 |
| 5,546,212 A * | 8/1996 | Kunikane et al. | 398/136 |
| 5,555,255 A | 9/1996 | Kock et al. | |
| 5,557,626 A | 9/1996 | Grodinski et al. | |
| 5,561,683 A | 10/1996 | Kwon | |
| 5,567,980 A | 10/1996 | Holonyak, Jr. et al. | |
| 5,568,498 A | 10/1996 | Nilsson | |
| 5,568,499 A | 10/1996 | Lear | |
| 5,574,738 A | 11/1996 | Morgan | |
| 5,581,571 A | 12/1996 | Holonyak, Jr. et al. | |
| 5,586,131 A | 12/1996 | Ono et al. | |
| 5,586,208 A * | 12/1996 | Nishiyama | 385/93 |
| 5,590,145 A | 12/1996 | Nitta | |
| 5,598,300 A | 1/1997 | Magnusson et al. | |
| 5,606,572 A | 2/1997 | Swirhun et al. | |
| 5,625,729 A | 4/1997 | Brown | |
| 5,642,376 A | 6/1997 | Olbright et al. | |
| 5,645,462 A | 7/1997 | Banno et al. | |
| 5,646,978 A | 7/1997 | Kem et al. | |
| 5,648,978 A | 7/1997 | Sakata | |
| 5,679,963 A | 10/1997 | Klem et al. | |
| 5,692,083 A | 11/1997 | Bennett | |
| 5,696,023 A | 12/1997 | Holonyak, Jr. et al. | |
| 5,699,373 A | 12/1997 | Uchida et al. | |
| 5,712,188 A | 1/1998 | Chu et al. | |
| 5,726,805 A | 3/1998 | Kaushik et al. | |
| 5,727,013 A | 3/1998 | Botez et al. | |
| 5,727,014 A | 3/1998 | Wang et al. | |
| 5,737,133 A * | 4/1998 | Ouchi et al. | 359/819 |
| 5,768,458 A * | 6/1998 | Ro et al. | 385/79 |
| 5,774,487 A | 6/1998 | Morgan | |
| 5,778,018 A | 7/1998 | Yoshikawa et al. | |
| 5,778,124 A * | 7/1998 | Nedstedt | 385/79 |
| 5,781,575 A | 7/1998 | Nilsson | |
| 5,784,399 A | 7/1998 | Sun | |
| 5,790,733 A | 8/1998 | Smith et al. | |
| 5,805,624 A | 9/1998 | Yang et al. | |
| 5,818,066 A | 10/1998 | Duboz | |
| 5,828,684 A | 10/1998 | Van de Walle | |
| 5,838,705 A | 11/1998 | Shieh et al. | |
| 5,838,715 A | 11/1998 | Corzine et al. | |
| 5,892,784 A | 4/1999 | Tan et al. | |
| 5,892,787 A | 4/1999 | Tan et al. | |
| 5,896,408 A | 4/1999 | Corzine et al. | |
| 5,901,166 A | 5/1999 | Nitta et al. | |
| 5,903,588 A | 5/1999 | Guenter et al. | |
| 5,903,589 A | 5/1999 | Jewell | |
| 5,903,590 A | 5/1999 | Hadley et al. | |
| 5,908,408 A | 6/1999 | McGary et al. | |
| 5,936,266 A | 8/1999 | Holonyak, Jr. et al. | |
| 5,940,422 A | 8/1999 | Johnson | |
| 5,940,564 A * | 8/1999 | Jewell | 385/93 |
| 5,953,362 A | 9/1999 | Pamulapati et al. | |
| 5,978,401 A | 11/1999 | Morgan | |
| 5,978,408 A | 11/1999 | Thornton | |
| 5,995,531 A | 11/1999 | Gaw et al. | |
| 6,002,705 A | 12/1999 | Thornton | |
| 6,008,675 A | 12/1999 | Handa | |
| 6,014,395 A | 1/2000 | Jewell | |
| 6,043,104 A | 3/2000 | Uchida et al. | |
| 6,046,065 A | 4/2000 | Goldstein et al. | |
| 6,052,398 A | 4/2000 | Brillouet et al. | |
| 6,055,262 A | 4/2000 | Cox et al. | |
| 6,060,743 A | 5/2000 | Sugiyama et al. | |
| 6,078,601 A | 6/2000 | Smith | |
| 6,086,263 A | 7/2000 | Selli et al. | |
| 6,133,590 A | 10/2000 | Ashley et al. | |
| 6,144,682 A | 11/2000 | Sun | |
| 6,154,480 A | 11/2000 | Magnusson et al. | |
| 6,157,012 A * | 12/2000 | Tanaka et al. | 219/633 |
| 6,185,241 B1 | 2/2001 | Sun | |
| 6,191,890 B1 | 2/2001 | Baets et al. | |
| 6,206,582 B1 * | 3/2001 | Gilliland | 385/92 |
| 6,208,681 B1 | 3/2001 | Thornton | |
| 6,212,312 B1 | 4/2001 | Grann et al. | |
| 6,238,944 B1 | 5/2001 | Floyd | |
| 6,269,109 B1 | 7/2001 | Jewell | |
| 6,297,068 B1 | 10/2001 | Thornton | |
| 6,302,596 B1 | 10/2001 | Cohen et al. | |
| 6,339,496 B1 | 1/2002 | Koley et al. | |
| 6,369,403 B1 | 4/2002 | Holonyak, Jr. | |
| 6,372,533 B2 | 4/2002 | Jayaraman et al. | |
| 6,392,257 B1 | 5/2002 | Ramdani et al. | |
| 6,410,941 B1 | 6/2002 | Taylor et al. | |
| 6,411,638 B1 | 6/2002 | Johnson et al. | |
| 6,421,474 B2 * | 7/2002 | Jewell et al. | 385/14 |
| 6,427,066 B1 | 7/2002 | Grube | |
| 6,454,470 B1 * | 9/2002 | Dwarkin et al. | 385/93 |
| 6,455,879 B1 | 9/2002 | Ashley et al. | |
| 6,459,709 B1 | 10/2002 | Lo et al. | |
| 6,459,713 B2 | 10/2002 | Jewell | |
| 6,462,360 B1 | 10/2002 | Higgins, Jr. et al. | |
| 6,472,694 B1 | 10/2002 | Wilson et al. | |
| 6,477,285 B1 | 11/2002 | Shanley | |
| 6,487,230 B1 | 11/2002 | Boucart et al. | |
| 6,487,231 B1 | 11/2002 | Boucart et al. | |
| 6,490,311 B1 | 12/2002 | Boucart et al. | |
| 6,493,371 B1 | 12/2002 | Boucart et al. | |

| | | | |
|---|---|---|---|
| 6,493,372 B1 | 12/2002 | Boucart et al. | |
| 6,493,373 B1 | 12/2002 | Boucart et al. | |
| 6,496,621 B1 | 12/2002 | Kathman et al. | |
| 6,498,358 B1 | 12/2002 | Lach et al. | |
| 6,501,973 B1 | 12/2002 | Foley et al. | |
| 6,515,308 B1 | 2/2003 | Kneissl et al. | |
| 6,535,541 B1 | 3/2003 | Boucart et al. | |
| 6,536,959 B2 | 3/2003 | Kuhn et al. | |
| 6,542,531 B2 | 4/2003 | Sirbu et al. | |
| 6,550,983 B1* | 4/2003 | Gilliland et al. | 385/93 |
| 6,567,435 B1 | 5/2003 | Scott et al. | |
| 6,801,687 B2* | 10/2004 | Pierce | 385/28 |
| 6,925,234 B2* | 8/2005 | Alexeev et al. | 385/52 |
| 2001/0004414 A1 | 6/2001 | Kunh et al. | |
| 2002/0130403 A1* | 9/2002 | Onodera et al. | 257/680 |
| 2002/0154675 A1 | 10/2002 | Deng et al. | |
| 2003/0072526 A1 | 4/2003 | Kathman et al. | |
| 2003/0210874 A1* | 11/2003 | Souda et al. | 385/89 |

FOREIGN PATENT DOCUMENTS

| | | | |
|---|---|---|---|
| EP | 0288184 A2 | | 10/1988 |
| EP | 0776076 A1 | | 5/1997 |
| GB | 2241349 A | * | 8/1991 |
| JP | 60123084 | | 1/1985 |
| JP | 02054981 | | 2/1990 |
| JP | 03071103 A | * | 3/1991 |
| JP | 04243179 A | * | 8/1992 |
| JP | 5299779 | | 11/1993 |
| WO | WO 98/57402 | | 12/1998 |

OTHER PUBLICATIONS

Bowers et al., "Fused Vertical Cavity Lasers With Oxide Aperture", Final report for MICRO project 96-042, Industrial Sponsor: Hewlett packard, 4 pages, 1996-97.

Catchmark et al., "High Temperature CW Operation of Vertical Cavity Top Surface-Emitting Lasers", CLEO 1993, p. 138.

Chemla et al., "Nonlinear Optical Properties of Semiconductor Quantum Wells", *Optical Nonlinearities and Instabilities in Semiconductors*, Academic Press, Inc., Copyright 1988, pp. 83-120.

Choe, et al., "Lateral oxidation of AlAs layers at elevated water vapour pressure using a closed-chamber system," Letter to the Editor, Semiconductor Science Technology, 15, pp. L35-L38, Aug. 2000.

Choa et al., "High-Speed Modulation of Vertical-Cavity Surface-Emitting Lasers", *IEEE Photonics Technology Letter*, vol. 3, No. 8, Aug. 1991, pp. 697-699.

Choquette et al., "High Single Mode Operation from Hybrid Ion Implanted/Selectively Oxidized VCSELs", 200 IEEE 17th International Semiconductor Laser Conference, Monterrey, CA pp. 59-60.

Choquette et al., "Lithographically-Defined Gain Apertures Within Selectively Oxidized VCSELs", paper CtuL6, Conference on Lasers and Electro-Optics, San Francisco, California (2000).

Choquette, et al., "VCSELs in information systems: 10Gbps$^{-1}$ oxide VCSELs for data communication", Optics In Information Systems, vol. 12, No. 1, p. 5, SPIE International Technical Group Newsletter, Aprl. 2001.

Chua, et al., "Low-Threshold 1.57- μm VC-SEL's Using Strain-Compensated Quantum Wells and Oxide/Metal backmirror," IEEE Photonics Technology Letters, vol. 7, No. 5, pp. 444-446, May 1995.

Chua, et al., "Planar Laterally Oxidized Vertical-Cavity Lasers for Low-Threshold High-Density Top-Surface-Emitting Arrays," IEEE Photonics Technology Letters, vol. 9, No. 8, pp. 1060-1062, Aug. 1997.

Cox, J. A., et al., "Guided Mode Grating Resonant Filters for VCSEL Applications", *Proceedings of the SPIE*, The International Society for Optical Engineering, Diffractive and Holographic Device Technologies and Applications V, San Jose, California, Jan. 28-29, 1998, vol. 3291, pp. 70-71.

Farrier, Robert G., "Parametric control for wafer fabrication: New CIM techniques for data analysis," Solid State Technology, pp. 99-105, Sep. 1997.

Fushimi, et al., "Degradation Mechanism in Carbon-doped GaAs Minority-carrier Injection Devices," 34th Annual IRPS Proceedings, Dallas, TX., Apr. 29-May 2, 1996, 8 pages.

G. G. Ortiz, et al., "Monolithic Integration of In0.2 GA0.8As Vertical Cavity Surface-Emitting Lasers with Resonance-Enhanced Quantum Well Photodetectors", *Electronics Letters*, vol. 32, No. 13, Jun. 20, 1996, pp. 1205-1207.

G. Shtengel et al., "High-Speed Vertical-Cavity Surface-Emitting Lasers", *Photon. Tech. Lett.*, vol. 5, No. 12, pp. 1359-13961 (Dec. 1993).

Geib, et al., "Comparison of Fabrication Approaches for Selectively Oxidized VCSEL Arrays," Proceedings of SPIE, vol. 3946, pp. 36-40, 2000.

Graf, Rudolph, *Modern Dictionary of Electronics*, 6th ed., Indiana: Howard W. Sams & Company, 1984, p. 694.

Guenter et al., "Reliability of Proton-Implanted VCSELs for Data Communications", Invited paper, SPIE, vol. 2683, OE LASE 96; Photonics West: Fabrication, Testing and Reliability of Semiconductor Lasers, (SPIE, Bellingham, WA 1996).

Guenter, et al., "Commercialization of Honeywell's VCSEL technology: further developments," Proceedings of the SPIE, vol. 4286, GSPIE 2000, 14 pages.

Hadley et al., "High-Power Single Mode Operation from Hybrid Ion Implanted/Selectively Oxidized VCSELs", 13th Annual Meeting IEEE Lasers and Electro-Optics Society 2000 Annual Meeting (LEOS 2000), Rio Grande, Peurto Rico, pp. 804-805.

Hawthorne, et al., "Reliability Study of 850 nm VCSELs for Data Communications," IEEE, pp. 1-11, May 1996.

Herrick, et al., "Highly reliable oxide VCSELs manufactured at HP/Agilent Technologies," Invited Paper, Proceedings of SPIE vol. 3946, pp. 14-19, 2000.

Hibbs-Brenner et al., "Performance, Uniformity and Yield of 850nm VCSELs Deposited by MOVPE", *IEEE Phot. Tech. Lett.*, vol. 8, No. 1, pp. 7-9, Jan. 1996.

Hideaki Saito, et al., "Controlling polarization of quantum-dot surface-emitting lasers by using structurally anisotropic self-assembled quantum dots", American Institute of Physics, Appl, Phys. Lett. 71 (5), pp. 590-592, Aug. 4, 1997.

Hornak et al., "Low-Temperature (10K-300K) Characterization of MOVPE-Grown Vertical-Cavity Surface-Emitting Lasers", *Photon. Tech. Lett.*, vol. 7, No. 10, pp. 1110-1112, Oct. 1995.

Huffaker et al., "Lasing Characteristics of Low Threshold Microcavity Layers Using Half-Wave Spacer Layers and Lateral Index Confinement", *Appl. Phys. Lett.*, vol. 66, No. 14, pp. 1723-1725, Aprl. 3, 1995.

Jewell et al., "Surface Emitting Microlasers for Photonic Switching & Intership Connections", *Optical Engineering*, vol. 29, No. 3, pp. 210-214, Mar. 1990.

Jiang et al., "High-Frequency Polarization Self-Modulation in Vertical-Cavity Surface-Emitting Lasers", *Appl. Phys. Letters*, vol. 63, No. 26, Dec. 27, 1993, pp. 2545-2547.

K.L. Lear et al., "Selectively Oxidized Vertical Cavity Surface-Emitting Lasers with 50% Power Conversion Efficiency", *Elec. Lett.*, vol. 31, No. 3 pp. 208-209, Feb. 2, 1995.

Kash, et al., "Recombinant in GaAs at the AlAs oxide-GaAs interface," Applied Physics Letters, vol. 67, No. 14, pp. 2022-2024, Oct. 2, 1995.

Kishino et al., "Resonant Cavity-Enhanced (RCE) Photodetectors", *IEEE Journal of Quantum Electronics*, vol. 27, No. 8, pp. 2025-2034.

Koley B., et al., "Dependence of lateral oxidation rate on thickness of AlAs layer of interest as a current aperture in vertical-cavity surface-emitting laser structures", Journal of Applied Physics, vol. 84, No. 1, pp. 600-605, Jul. 1, 1998.

Kuchibhotla et al., "Low-Voltage High Gain Resonant_Cavity Avalanche Photodiode", *IEEE Phototonics Technology Letters*, vol. 3, No. 4, pp. 354-356.

Lai et al., "Design of a Tunable GaAs/AlGaAs Multiple-Quantum-Well Resonant Cavity Photodetector", *IEEE Journal of Quantum Electronics*, vol. 30, No. 1, pp. 108-114.

Lee et al., "Top-Surface Emitting GaAs Four-Quantum-Well Lasers Emitting at 0-85 um", *Electronics Letters*, vol. 24, No. 11, May 24, 1990, pp. 710-711.

Lehman et al., "High Frequency Modulation Characteristics of Hybrid Dielectric/AlGaAs Mirror Singlemode VCSELs", *Electronics Letters*, vol. 31, No. 15, Jul. 20, 1995, pp. 1251-1252.

Maeda, et al., "Enhanced Glide of Dislocations in GaAs Single Crystals by Electron Beam Irradiation," Japanese Journal of Applied Physics, vol. 20, No. 3, pp. L165-L168, Mar. 1981.

Magnusson, "Integration of Guided-Mode Resonance Filters and VCSELs", Electo-Optics Research Center, Department of Electrical Engineering, University of Texas at Arlington, May 6, 1997.

Martinsson et al., "Transverse Mode Selection in Large-Area Oxide-Confined Vertical-Cavity Surface-Emitting Lasers Using a Shallow Surface Relief", *IEEE Photon. Technol. Lett.*, 11(12) 1536-1538 (1999).

Miller et al., "Optical Bistability Due to Increasing Absorption", *Optics Letters*, vol. 9, No. 5, May 1984, pp. 162-164.

Min Soo Park and Byung Tae Ahn, "Polarization control of vertical-cavity surface-emitting lasers by electro-optic birefringence," Applied Physics Letter, vol. 76, No. 7, pp. 813-815, Feb. 14, 2000.

Morgan et al., "200 C, 96-nm Wavelength Range, Continuous-Wave Lasing from Unbonded GaAs MOVPE-Grown Vertical Cavity Surface-Emitting Lasers", *IEEE Photonics Technology Letters*, vol. 7, No. 5, May 1995, pp. 441-443.

Morgan et al., "High-Power Coherently Coupled 8×8 Vertical Cavity Surface Emitting Laser Array", *Appl. Phys Letters*, vol. 61, No. 10, Sep. 7, 1992, pp. 1160-1162.

Morgan et al., "Hybrid Dielectric/AlGaAs Mirror Spatially Filtered Vertical Cavity Top-Surface Emitting Laser", *Appl. Phys. Letters*, vol. 66, No. 10, Mar. 6, 1995, pp. 1157-1159.

Morgan et al., "Novel Hibrid-DBR Single-Mode Controlled GaAs Top-Emitting VCSEL with Record Low Voltage", 2 pages, dated prior to Dec. 29, 2000.

Morgan et al., "One Watt Vertical Cavity Surface Emitting Laser", *Electron. Lett.*, vol. 29, No. 2, pp. 206-207, Jan. 21, 1993.

Morgan et al., "Producting GaAs-based MOVPE-Grown Vertical-Cavity Top-Surface Emitting Lasers with Record Performance", *Elec. Lett.*, vol. 31, No. 6, pp. 462-464, Mar. 16, 1995.

Morgan et al., "Progress and Properties of High-Power Coherent Vertical Cavity Surface Emitting Laser Arrays", *SPIE*, Vo. 1850, Jan. 1993, pp. 100-108.

Morgan et al., "Progress in Planarized Vertical Cavity Surface Emitting Laser Devices and Arrays", *SPIE*, vol. 1562, Jul. 1991, pp. 149-159.

Morgan et al., "Spatial-Filtered Vertical-Cavity Top Surface-Emitting Lasers", CELO, 1993, pp. 138-139.

Morgan et al., "Submilliamp, Low-Resistance, Continuous-Wave, Single-Mode GaAs Planar Vertical-Cavity Surface Emitting Lasers", Honeywell Technology Center, Jun. 6, 1995.

Morgan et al., "Transverse Mode Control of Vertical-Cavity Top-Surface Emitting Lasers", *IEEE Photonics Technology Letters*, vol. 4, No. 4, Apr. 1993, pp. 374-377.

Morgan et al., "Vertical-cavity surface-emitting laser arrays", Invited Paper, *SPIE*, vol. 2398, Feb. 6, 1995, pp. 65-93.

Morgan et al., Vertical-cavity surface emitting lasers come of age, Invited paper, *SPIE*, vol. 2683, 0-8194-2057, Mar. 1996, pp. 18-29.

Morgan, "High-Performance, Producible Vertical Cavity Lasers for Optical Interconnects", *High Speed Electronics and Systems*, vol. 5, No. 4, Dec. 1994, pp. 65-95.

Naone R.L., et al., "Tapered-apertures for high-efficiency miniature VCSELs", LEOS newsletter, vol. 13, No. 4, pp. 1-5, Aug. 1999.

Nugent et al., "Self-Pulsations in Vertical-Cavity Surface-Emitting Lasers", *Electronic Letters*, vol. 31, No. 1, Jan. 5, 1995, pp. 43-44.

Oh, T. H. et al., "Single-Mode Operation in Antiguided Vertical-Cavity Surface-Emitting Laser Using a Low-Temperature Grown AlGaAs Dielectric Aperture", *IEEE Photon. Technol. Lett*, 10(8), 1064-1066 (1998).

Osinski, et al., "Temperature and Thickness Dependence of Steam Oxidation of AlAs in Cylindrical Mesa Structure," IEEE Photonics Technology Letters, vol. 13, No. 7, pp. 687-689, Jul. 2001.

Peck, D. Stewart, Comprehensive Model for Humidity Testing Correlation, IEEE/IRPS, pp. 44-50, 1986.

Ries, et al., "Visible-spectrum ($\lambda$=650nm) photopumped (pulsed, 300 K) laser operation of a vertical-cavity AlAs-AlGaAs/InAIP-InGaP quantum well heterostructure utilizing native oxide mirrors," Applied Physics Letters, vol. 67, No. 8, pp. 1107-1109, Aug. 21, 1995.

S.S. Wang and R. Magnusson, "Multilayer Waveguide-Grating Filters", *Appl. Opt.*, vol. 34, No. 14, pp. 2414-2420, 1995.

S.S. Wang and R. Magnusson, "Theory and Applications of Guided-Mode Resonance Filters", *Appl. Opt.*, vol. 32, No. 14, pp. 2606-2613, 1993.

Sah, et al., "Carrier Generation and Recombination in *P-N* Junctions and *P-N* Junction Characteristics," Proceedings of the IRE, pp. 1228-1243, Sep. 1957.

Schubert, "Resonant Cavity Light-Emitting Diode", *Appl. Phys. Lett.*, vol. 60, No. 8, pp. 921-923, Feb. 24, 1992.

Shi, et al., "Photoluminescence study of hydrogenated aluminum oxide-semiconductor interface," Applied Physics Letters, vol. 70, No. 10, pp. 1293-1295, Mar. 10, 1997.

Smith, R.E. et al., Polarization-Sensitive Subwavelength Antireflection Surfaces on a Semiconductor for 975 NM, *Optics Letters*, vol. 21, No. 15, Aug. 1, 1996, pp. 1201-1203.

Spicer, et al., "The Unified Model For Schottky Barrier Formation and MOS Interface States in 3-5 Compounds," Applications of Surface Science, vol. 9, pp. 83-01, 1981.

Suning Tang et al., "Design Limitations of Highly Parallel Free-Space Optical Interconnects Based on Arrays of Vertical Cavity Surface-Emitting Laser Diodes, Microlenses, and Photodetectors", Journal of Lightwave Technology, vol. 12, No. 11, Nov. 1, 1994, pp. 1971-1975.

T. Mukaihara, "Polarization Control of Vertical-cavity Surface-Emitting Lasers by a Birefringent Metal/Semiconductor Polarizer Terminating a Distributed Bragg Reflector," Tokyo Institute of Technology, Precision and Intelligence Laboratory, pp. 183-184.

Tao, Andrea, "Wet-Oxidation of Digitally Alloyed AlGaAs," National Nanofabrication Users Network, Research Experience for Undergraduates 2000, 2 pages.

Tautm, et al., Commerialization of Honeywell's VCSEL Technology, Published in Proceedings fo the SPIE, vol. 3946, SPI, 2000, 12 pages.

Tshikazu Mukaihara, et al., "A Novel Birefringent Distributed Bragg Reflector Using a Metal/Dielectric Polarizer for Polarization Control of Surface-Emitting Lasers," Japan J. Appl. Phys. vol. 33 (1994) pp. L227-L229, Part 2, No. 2B, Feb. 15, 1994.

Tu, Li-Wei et al., "Transparent conductive metal-oxide contacts in vertical-injection top-emitting quantum well lasers", Appl. Phys. Lett. 58 (8) Feb. 25, 1991, pp. 790-792.

Wieder, H.H., "Fermi level and surface barrier of $Ga_xIn_{1-x}As$ alloys," Applied Physics Letters, vol. 38, No. 3, pp. 170-171, Feb. 1, 1981.

Wipiejewski, et al., "VCSELs for datacom applications," Invited Paper, Part of the SPIE Conference on Vertical-Cavity Surface-Emitting Lasers III, San Jose, California, SPIE vol. 3627, pp. 14-22, Jan. 1999.

Y. M. Yang et al., "Ultralow Threshold Current Vertical Cavity Surface Emitting Lasers Obtained with Selective Oxidation", *Elect. Lett.*, vol. 31, No. 11, pp. 886-888, May 25, 1995.

Yablonovitch et al., "Photonic Bandgap Structures", *J. Opt. Soc. Am. B.*, vol. 10, No. 2, pp. 283-295, Feb. 1993.

Young et al., "Enhanced Performance of Offset-Gain High Barrier Vertical-Cavity Surface-Emitting Lasers", *IEEE J. Quantum Electron.*, vol. 29, No. 6, pp. 2013-2022, Jun. 1993.

U.S. Appl. No. 09/751,422, filed Dec. 29, 2000, entitled "Resonant Reflector for Use with Optoelectronic Devices".

U.S. Appl. No. 09/751,423, filed Dec. 29, 2000, entitled "Spatially Modulated Reflector for an Optoelectronic Device".

* cited by examiner

PLUGGABLE OPTICAL OPTIC SYSTEM HAVING A LENS FIBER STOP

BACKGROUND

The invention relates to optical couplers and particularly to such devices that couple optoelectronic elements and optical fiber. More particularly, the invention relates to couplers having lenses.

Several patent documents may be related to optical coupling between optoelectronic elements and optical media. They include U.S. Pat. No. 6,086,263 by Selli et al., issued Jul. 11, 2000, entitled "Active Device Receptacle" and owned by the assignee of the present application; U.S. Pat. No. 6,302,596 B1 by Cohen et al., issued Oct. 16, 2001, and entitled "Small Form Factor Optoelectronic Receivers"; U.S. Pat. No. 5,692,083 by Bennet, issued Nov. 25, 1997, and entitled "In-Line Unitary Optical Device Mount and Package therefore"; and U.S. Pat. No. 6,536,959 B2, by Kuhn et al., issued Mar. 25, 2003, and entitled "Coupling Configuration for Connecting an Optical Fiber to an Optoelectronic Component"; which are herein incorporated by reference.

In the context of the invention, the optoelectronic element may be understood as being a transmitter or a receiver. When electrically driven, the optoelectronic element in the form of a transmitter or light source converts the electrical signals into optical signals that are transmitted as light signals. On receiving optical signals, the optoelectronic element in the form of a receiver or detector converts these signals into corresponding electrical signals that can be tapped off at the output. In addition, an optical fiber may be understood to be any apparatus for forwarding an optical signal with spatial limitation, in particular preformed optical fibers and so-called waveguides.

A problem with couplers may involve light reflected back to the light source. This may be an issue because, for instance, some fiber optic transmitters suffer from undesirable and performance degrading reflections from the face end of the optical fiber back into the coupled optoelectronic element device (e.g., a semiconductor laser). Here, the fiber's surface and facing surface of the optoelectronic element device form a Fabry-Perot cavity which may modulate the light from the laser transmitter or semiconductor laser and consequently produce unwanted fluctuations in the power coupled to the optical fiber. Further, the optical energy reflected directly into the laser cavity may cause additional noise in the laser's output. For these reasons, it would be desirable to reduce and minimize the return reflections from the fiber face in the coupler.

SUMMARY

The invention is an optical coupler which may couple a light source or detector and optical fiber to each other. The coupler may have a fiber stop which is a lens. That is, the optical fiber may have an end that is in contact with a lens of the coupler.

DESCRIPTION

Figure 1:
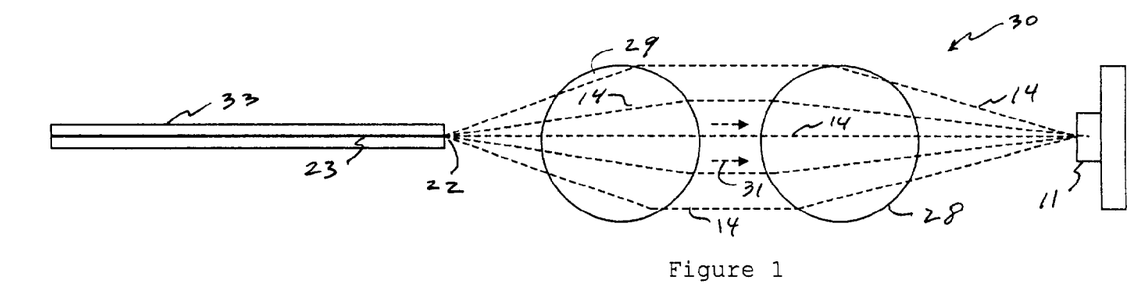
FIG. 1 is an optical diagram of a two ball lens coupler having an air gap between the optical fiber end and the nearest lens.

FIG. 1 shows an optical layout of a two-ball lens optical coupler 30. This two-ball lens system may be arranged to focus the light at a point outside the second ball lens 29, possibly often with light 14 nearly perfectly collimated between ball lenses 28 and 29. Light 14 may be emitted by a light source 11. Source 11 may be a laser such as a vertical cavity surface emitting laser. Light 14 may propagate through ball lens 28 and 29. Light 14 may be focused by lens 28 and 29 on end face 22 of core 23 of optical fiber 33. Light 14 may propagate from ball lens 29 through air onto the end of core 23. The Fresnel coefficient of back reflectance 31 of light 14 for coupler 30 may be determined with the following formula, where "n" is an index of refraction of light of the subject material, $$((n_{lens\ glass} - n_{air})/(n_{lens\ glass} + n_{air}))^2.$$

Calculation of reflected light 31 may amount to about 4 percent of the originally emitted light 14 for an $n_{lens\ glass}=1.5$ and $n_{air}=1.0$. This amount of back reflectance light 31 is significant enough to cause unwanted fluctuations in power of light 14 from source 11 coupled to core 23 of optical fiber 33 at end face 22 and additional noise in light 14 at the output of light source 11.

Figure 2:
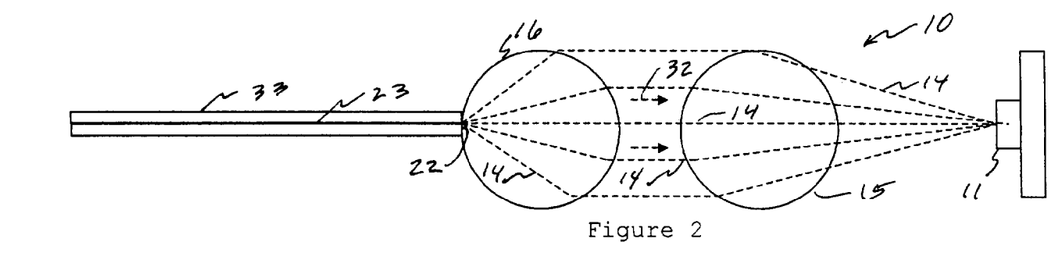
FIG. 2 is a diagram of a two ball lens coupler having a fiber stop lens.

FIG. 2 shows an optical layout of a two-ball optical coupler 10. Light 14 may be emanated by source 11. Light 14 may propagate through ball lens 15 and into ball lens 16, respectively. Ball lens 16 may focus light 14 down to a spot at or near the surface of lens 16 where light 14 may exit lens 16. Core 23 of fiber 33 may have end face 22 that is situated against the surface of ball lens 16 at that spot where the rays of light 14 converge together. This arrangement may minimize reflectance of light 14 into light 32 that moves towards the direction of light source 11. One cause of reflected light 32 may be at end face 22 of fiber core 23 being coupled. A reduction of reflectance light 32 may result from having end face 22 of core 23 of fiber 33 of coupler 10 physically in contact with a lens, such as ball lens 16. The reduction of reflected light 32 may occur because an air interface between lens 16 and fiber end 22 is eliminated at the point of contact. The Fresnel coefficient of back reflectance 32 of light 14, in view of coupler 10, may be determined with the following formula, $$((n_{lens\ glass} - n_{glass\ fiber})/(n_{lens\ glass} + n_{glass\ fiber}))^2.$$

Calculation of reflected light 32 may amount to about 0.01 percent of light 14 for an $n_{glass\ fiber}=1.47$ and $n_{lens\ glass}=1.5$. This calculated amount of reflected light 32 in coupler 10 is about 0.25 percent of the calculated reflected light 31 in coupler 30.

Figure 3:
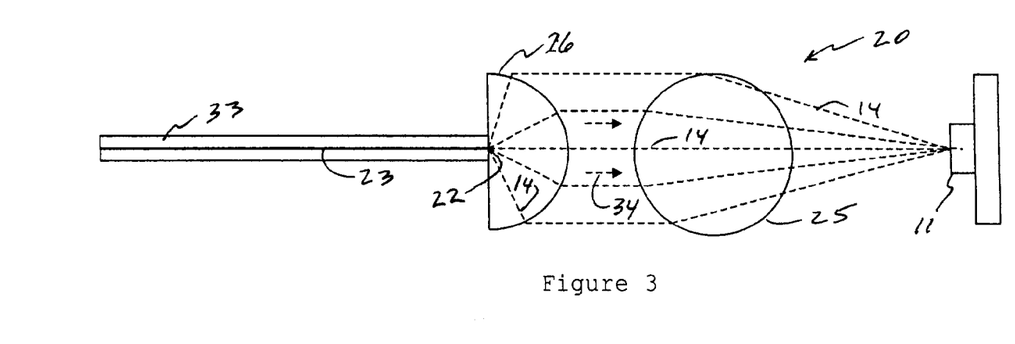
FIG. 3 is a diagram of a one and a half lens couple having a flat lens surface as a fiber stop.

FIG. 3 shows an optical layout of a one and a half-ball optical coupler 20. Light 14 may be emitted by light source 11. Light 14 may propagate through ball lens 25 and into a half-ball lens 26. Half-ball lens 26 may focus light 14 down to a spot at or near the flat surface of lens 26 where light 14 may exit lens 26. Core 23 of fiber 33 may have an end 22 that is situated against the flat surface of ball lens 26 at that spot where the rays of light 14 converge together. This arrangement may minimize reflectance of light 14 as light 34 propagating towards the direction of light source 11. One cause of reflection may be at end face 22 of fiber core 23 being coupled. A reduction of reflectance light 34 may result from having end face 22 of core 23 of fiber 33 of coupler 10 physically in contact with half-ball lens 26. The reduction of reflected light 34 may occur because the air interface between lens 26 and fiber end 22 is eliminated with the point of contact. The Fresnel coefficient of back reflectance 34 of light 14, in view of coupler 20, may be determined with the following applicable formula, $$((n_{lens\ glass} - n_{glass\ fiber})/(n_{lens\ glass} + n_{glass\ fiber}))^2.$$

Calculation of reflected light 34 may amount to about 0.01 percent of light 14 for an $n_{glass\ fiber} = 1.47$ and $n_{lens\ glass} = 1.5$. This calculated amount of reflected light 34 in coupler 20 is about 0.25 percent of the calculated reflected light 31 in coupler 30. The closeness of the indices of refraction of the glass fiber and lens glass appears to result in a minimizing of light reflected from the fiber core end face. The composition of ball lenses 15, 16, 25, 26, 28 and 29 may include BK7™ glass or like material.

The following table indicates the amount of reflected light which is indicated in terms of a percentage of light to the end of the optical medium such as a fiber end face relative to the indices of refraction of the lens proximate to the optical medium and of the optical medium. The formula used for the table is $$((n_{lens\ glass} - n_{medium})/(n_{lens\ glass} + n_{medium}))^2.$$

| $n_{lens\ glass}$ | $n_{medium}$ | % of Reflected Light |
| --- | --- | --- |
| 1.50 | 1.00 | 4.00 |
| 1.50 | 1.10 | 2.37 |
| 1.50 | 1.20 | 1.23 |
| 1.50 | 1.30 | 0.510 |
| 1.50 | 1.35 | 0.277 |
| 1.50 | 1.40 | 0.119 |
| 1.50 | 1.41 | 0.0957 |
| 1.50 | 1.42 | 0.0751 |
| 1.50 | 1.425 | 0.0657 |
| 1.50 | 1.43 | 0.0571 |
| 1.50 | 1.44 | 0.0416 |
| 1.50 | 1.45 | 0.0287 |
| 1.50 | 1.46 | 0.0183 |
| 1.50 | 1.47 | 0.0120 |
| 1.50 | 1.48 | 0.00450 |
| 1.50 | 1.49 | 0.00112 |

If the medium has an index of refraction 10 percent lower than that of the lens, the light reflected is about 0.277 percent of the light going to the medium, which is about 7 percent of light reflected with air as an intervening medium between the lens and the optical medium. If the medium has an index of refraction 5 percent lower than that of the lens, the light reflected is about 0.0657 percent of the light going to the medium, which is about 1.6 percent of light reflected with air as an intervening medium between the lens and the optical medium. In the table, the medium may be the intervening medium. However, if there is contact between the lens and the optical medium the calculation may apply to the index of refraction of the optical medium. Hence, while this discussion has shown that the optimum implementation of this invention includes matching the fiber stop optical element's index of refraction to that of the fiber, significant practical performance gain (i.e., reduction of reflectance feedback) is accomplished even in imperfectly index matched implementations.

Figure 4:
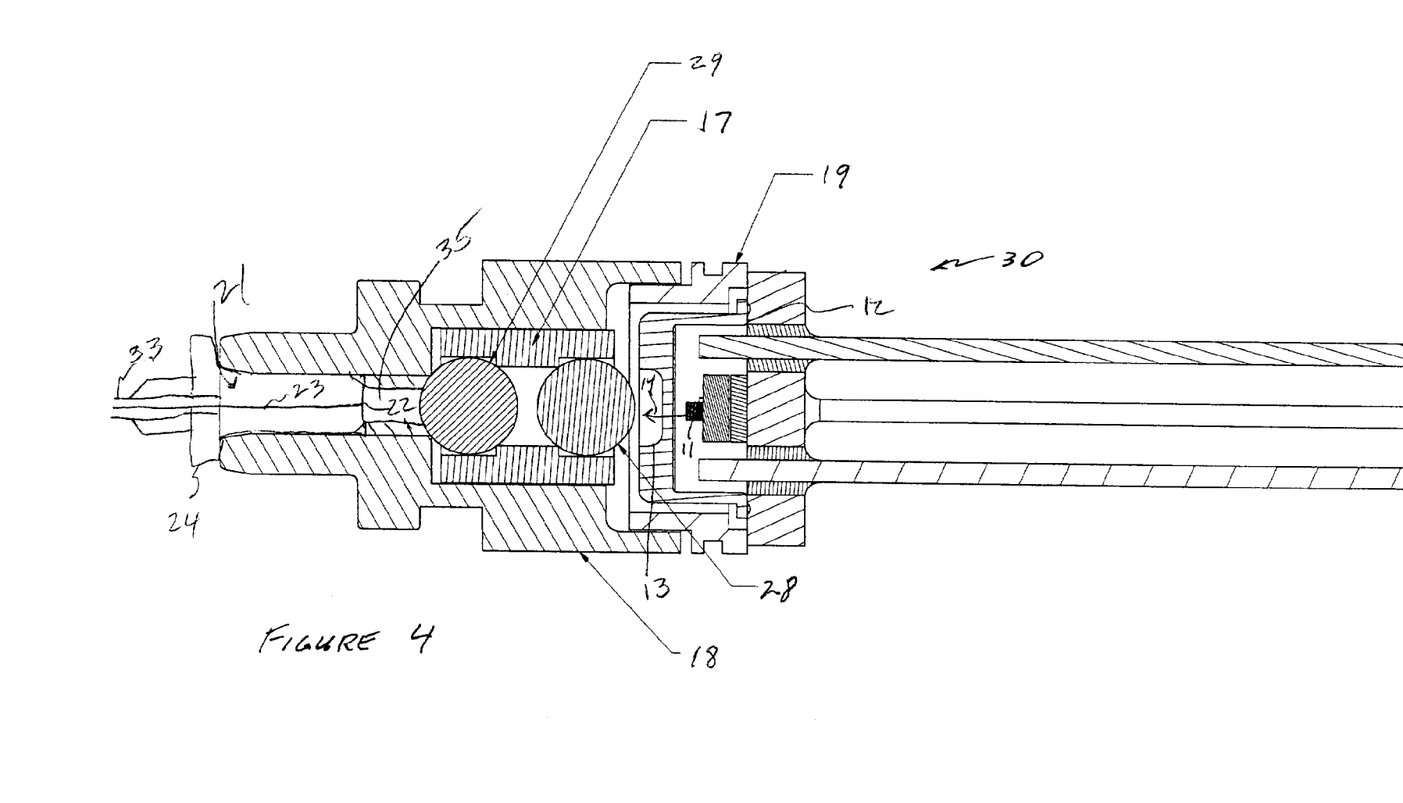
FIG. 4 is a side sectional view of a two-ball lens coupler apparatus implementing the coupler of FIG. 1.

FIG. 4 shows an example of coupler 30. This coupler may be a two ball lens system having an optical fiber 33 interface with a space 35 between the nearest ball lens 29 and fiber face 22. Space 35 may be a vacuum or filled with air or other optical medium material. Coupler 30 may have a laser light source 11, such as a vertical cavity surface emitting laser (VCSEL). Source 11 may be contained in a hermetically sealed package 12 having a window 13. Source 11 may emit light 14 through window 13, ball lenses 28 and 29. Lenses 28 and 29 may be structurally supported by an optical subassembly housing 17. Housing 17 may be structurally supported by fiber optic coupler barrel 18. Package 12 may be situated in a z-alignment sleeve 19. Package 12, for example, may be a TO-56 can. Barrel 18 and sleeve 19 may be fabricated from a stainless metal alloy. The materials of these components, including housing 17, may be thermally matched. Housing 17 may be of a ceramic such as zirconia or of a metal. Sleeve 19 may be fit into barrel 18 and slide back and forth in order to adjust the distance of source 11 from ball lens 28.

After the accomplishment of distance adjustment between source 11 and lens 28, then sleeve 19 may be fixed or secured to barrel 18 with a weld spot, pressed fit, glue, or the like. A ferrule 24 having an optical fiber 33 in it may be inserted into opening 21. An end face 22 of fiber 33 may be at a certain distance from ball lens 29, with air or another medium between end face 22 and ball lens 29. The other medium between end face 22 and ball lens 29 may be a light transmitting optical medium having a preferred index of refraction. The index of refraction may match the index of fiber core 23 or lens 29, or both of the latter. The distances of the ball lens 29 from fiber end face 22 and ball lens 28 and of ball lens 28 from light source 11 may be adjusted for another optical medium between ball lens 29 and end face 22.

Couplers 10, 20 and 30 may be designed to operate at 850 nm, 1310 nm or 1550 nm. They may instead be designed for some other wavelength. These couplers may be designed in various configurations such as with one lens, molded lens or lenses, or more than two lenses.

Figure 5:
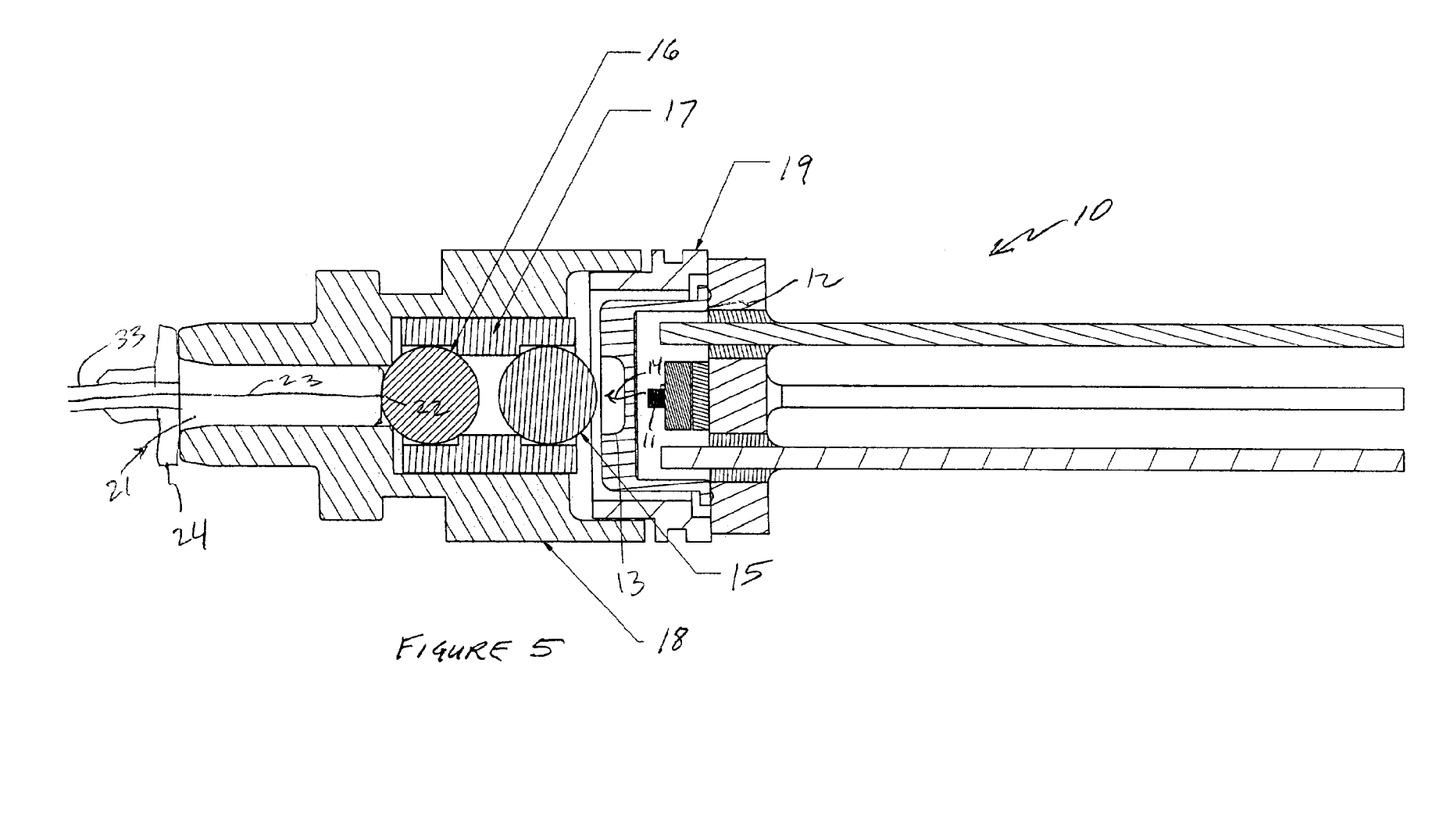
FIG. 5 is a side sectional view of a two-ball lens coupler apparatus implementing the coupler of FIG. 2.

FIG. 5 shows an illustrative implementation of coupler 10. The structure of coupler 10 may be similar to that of coupler 30 except that ball lens 16, which is the lens closest to fiber end face 22, may be a fiber stop for fiber 33 and its core 23. Coupler 10 may have a lens arrangement, which includes a ball lens 15 near source 11, has the light focused at or slightly inside the second ball lens 16 surface so that the source 11 to fiber 33 ray path may be much different than that of coupler 30. Fiber 33 being coupled to may be arranged in such a manner that it is in physical contact with the surface of the second ball lens 16. The components of coupler 10 may be held in place by an external housing fabricated in such a manner that the laser diode, optical elements and receiving optical fiber cable are held in the correct positions to effect the above-noted focusing.

Figure 6:
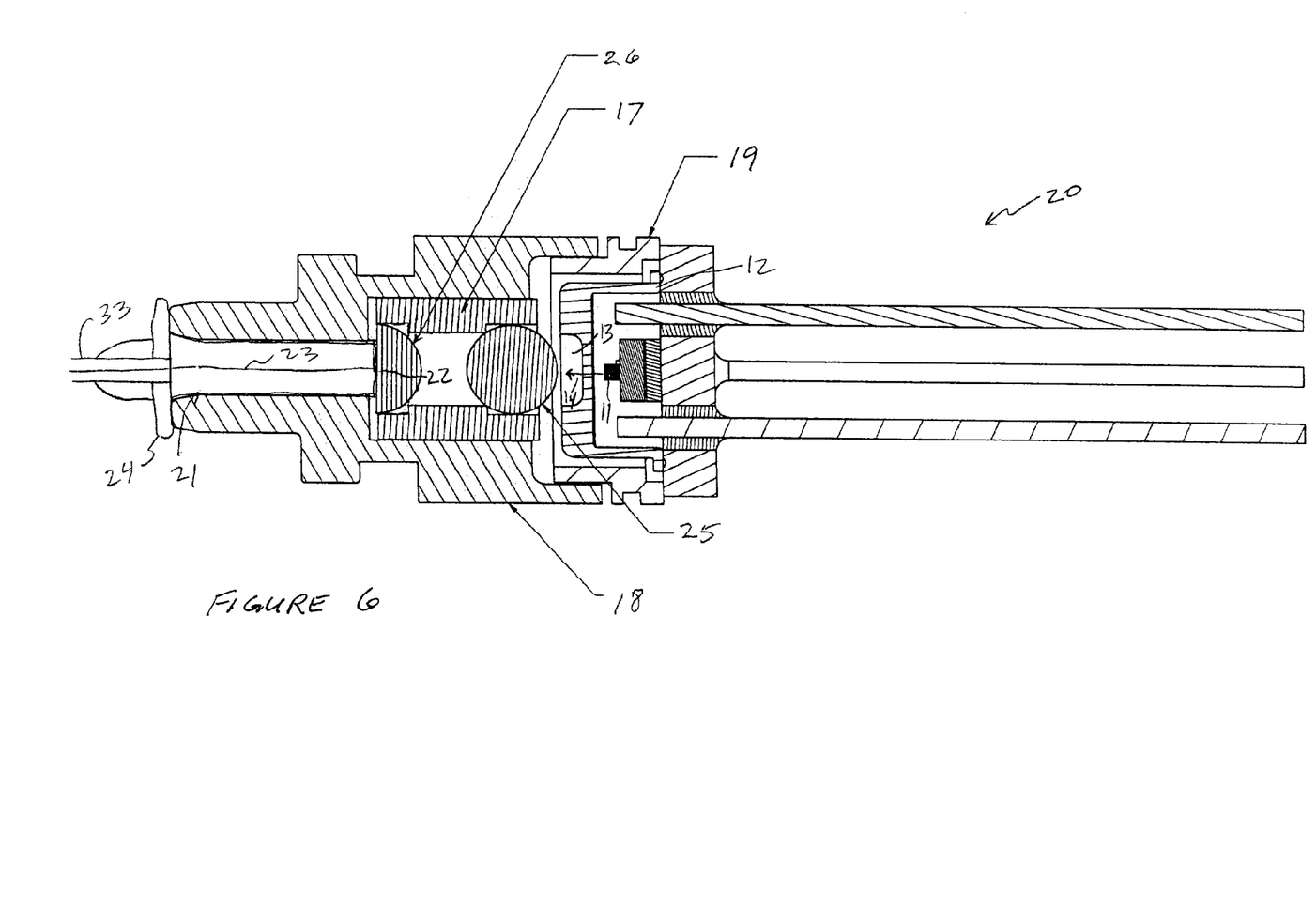
FIG. 6 is a side sectional view of a one and a half ball lens coupler implementing the coupler of FIG. 3.

FIG. 6 shows an illustrative implementation of coupler 20. System 20 may involve a use of a half-ball lens 26 in the system. In this two element full ball-half ball design, the fiber-to-lens contact is thus planar instead of a single point of contact as in the two-ball lens approach of system 10. The half-ball lens configuration may have the advantages of loosened radial alignment tolerances and reduced contact pressure which may make fiber end face 22 and fiber stop lens 26 less prone to wear or potential surface damage upon repeated insertions of ferrule 24. Ferrule 24 may be fabricated from a ceramic such as zirconia or form another material. End face 22 of core 23 may be a polished round surfaced tip having a relatively large radius or be flat. There may be a ball lens 25 between lens 26 and source 11. Fiber 33 may be single mode but could be multi-mode as desired. Likewise, light source 11 may be single mode but could be multi-mode.

Figure 7A:
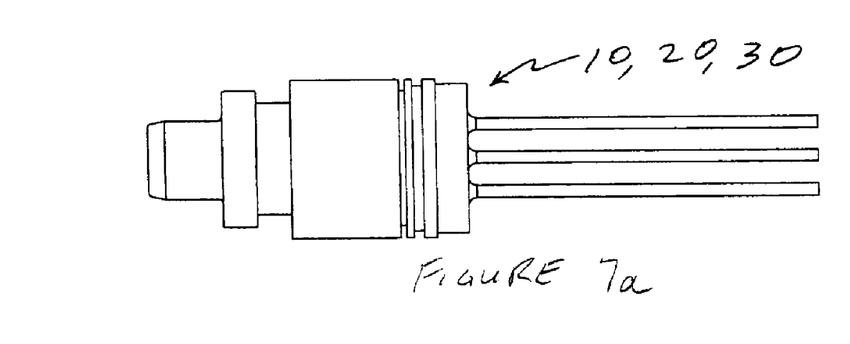
FIGS. 7a, 7b and 7c are a side view and perspective views, respectively, of the coupler housing hardware.
Figure 7B:
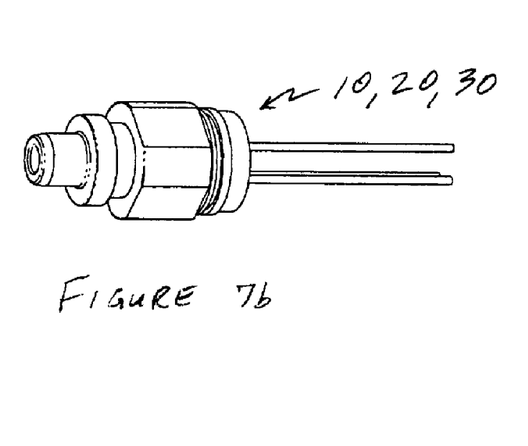
Figure 7C:
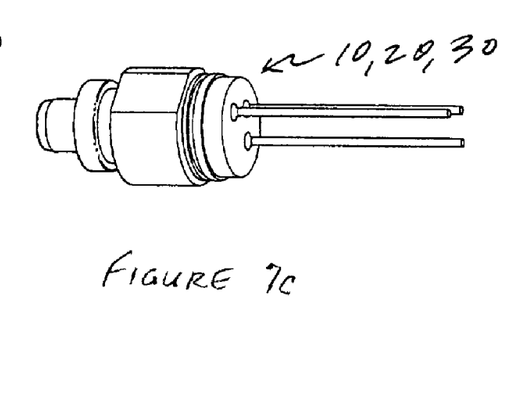

FIG. 7a shows an external side view of couplers 10, 20 and 30, without ferrule 24 inserted, shown in FIGS. 4-6. FIGS. 7b and 7c are perspective views of these couplers.

A multitude of the optical couplers may be incorporated in an array-arrangement. Such arrangement may be of a one or two dimensional layout.

Although the invention has been described with respect to at least one illustrative embodiment, many variations and modifications, including aspheric lens variations, modifications and substitutions, will become apparent to those skilled in the art upon reading the present specification. It is therefore the intention that the appended claims be interpreted as broadly as possible in view of the prior art to include all such variations and modifications.

What is claimed is:

1. An optical apparatus comprising:
a half-ball lens;
a ball lens proximate to the half-ball lens;
a substantially hollow housing within which the half-ball lens and the ball lens are at least partially disposed; and
a barrel within which the housing is disposed, the barrel comprising:
a first receptacle proximate to the half-ball lens configured to receive an optical medium; and
a second receptacle proximate to the ball lens configured to receive an optical package.

2. The optical apparatus of claim 1, wherein:
the first receptacle is configured to receive an optical medium comprising an optical fiber; and
the half-ball lens is a fiber stop.

3. An optical device comprising:
an optical package having a window; and
a barrel configured to receive and optically couple the optical package to an optical medium, the barrel comprising:
a ball lens;
a half-ball lens proximate to the ball lens, the ball lens and the half-ball lens at least partially positioned within a ceramic or metallic housing that is disposed inside the barrel; and
a receptacle proximate to the ball lens and configured to receive the optical package such that the window of the optical package is proximate to the ball lens.

4. The device of claim 3, wherein a detector is disposed in the optical package.

5. The device of claim 3, wherein:
the barrel is configured to receive an optical medium comprising an optical fiber; and
the half-ball lens is a fiber stop.

6. The device of claim 3, wherein a light source is disposed in the optical package.

7. The device of claim 6, wherein the light source is a vertical cavity surface emitting laser.

8. The device of claim 3, wherein:
the barrel is configured to receive an optical medium comprising an optical fiber; and the half-ball lens has an approximately flat surface that is a fiber stop.

9. The device of claim 8, wherein the half ball lens has a refractive index that is within about ten percent of the refractive index of an optical fiber received in the barrel.

10. An optical coupler, comprising:
an alignment sleeve configured to receive an optical package;
a housing;
a first lens at least partially disposed within the housing;
a second lens positioned proximate the first lens and at least partially disposed within the housing, wherein one of the first and second lenses is a half-ball lens; and
a barrel within which the housing is disposed, the barrel comprising:
a first receptacle proximate to the first lens and configured to receive an optical fiber; and
a second receptacle proximate to the second lens configured to receive the alignment sleeve.

11. The optical coupler as recited in claim 10, wherein one of the first and second lenses is a ball lens.

12. The optical coupler as recited in claim 10, wherein the alignment sleeve is configured to receive an optical package comprising a TO can.

13. The optical coupler as recited in claim 10, wherein the first lens is a half-ball lens.

14. The optical coupler as recited in claim 10, wherein the second lens is a ball lens.

15. The optical coupler as recited in claim 10, wherein the alignment sleeve is configured to receive an optical package that includes a light source or a detector arranged for optical coupling with the first and second lenses.

16. The optical coupler as recited in claim 10, wherein an index of refraction of the first lens is substantially the same as the index of refraction of an optical fiber received in the first receptacle.

17. The optical coupler as recited in claim 10, wherein the first lens is arranged for physical contact with an end face of an optical fiber received in the first receptacle.

18. The optical apparatus of claim 1, wherein the substantially hollow housing is at least partially made of a ceramic or metallic material.

19. The optical apparatus of claim 1, wherein the substantially hollow housing is at least partially made of zirconia.

20. The optical apparatus of claim 1, wherein the first receptacle is configured to receive the optical medium at a position creating a space between the optical medium and the first lens.

21. The optical device as recited in claim 10, wherein the second receptacle is configured to receive the alignment sleeve at multiple positions within the second receptacle to enable the optical alignment of the optical package with the second lens.

22. The optical device as recited in claim 10, wherein the alignment sleeve is a Z-alignment sleeve configured to adjust the distance between a light source within an optical package and the second lens along a central axis defined by the barrel.

23. An optical coupler, comprising:
a barrel;
a housing at least partially situated within the barrel;
a first lens at least partially situated within the housing;
a second lens at least partially situated within the housing;
a first receptacle defined in the barrel and configured to receive a ferrule having an optical fiber such that an end face of the optical fiber makes physical contact with a surface of the first lens when the ferrule is fully received within the first receptacle;

a second receptacle defined in the barrel; and an optical package at least partially situated within the second receptacle.

24. The optical coupler as recited in claim 23, wherein the first lens is a ball lens and the second lens is a ball lens.

25. The optical coupler as recited in claim 23, wherein the first lens is a half-ball lens and the second lens is a ball lens.

26. The optical coupler as recited in claim 23, wherein the first lens is a ball lens and the second lens is a half-ball lens.

27. The optical coupler as recited in claim 23, wherein the optical package is a hermetically sealed package having a window.

28. The optical coupler as recited in claim 23, wherein the optical package includes a laser light source.

29. The optical coupler as recited in claim 28, wherein the laser light source is a vertical cavity surface emitting laser.

30. The optical coupler as recited in claim 23, wherein the optical package includes a detector.

31. The optical coupler as recited in claim 23, further comprising a z-alignment sleeve at least partially situated within the second receptacle and between the optical package and the barrel.

32. The optical coupler as recited in claim 23, wherein the barrel is at least partially fabricated from a stainless metal alloy.

33. The optical coupler as recited in claim 23, wherein the housing is at least partially fabricated from a ceramic or a metal.

34. The optical coupler as recited in claim 23, further comprising a ferrule having an optical fiber, the ferrule configured to be received in the first receptacle such that an end face of the optical fiber makes physical contact with a surface of the first lens.

35. The optical coupler as recited in claim 34, wherein the optical fiber is a single mode fiber.

36. The optical coupler as recited in claim 34, wherein the optical fiber is a multi-mode fiber.

37. The optical coupler as recited in claim 34, wherein an index of refraction of the optical fiber substantially matches an index of refraction of the first lens.

38. The optical coupler as recited in claim 34, wherein the ferrule is at least partially fabricated from a ceramic.

* * * * *

UNITED STATES PATENT AND TRADEMARK OFFICE
CERTIFICATE OF CORRECTION

PATENT NO. : 7,298,942 B2  Page 1 of 1
APPLICATION NO. : 10/456123
DATED : November 20, 2007
INVENTOR(S) : Blasingame et al.

It is certified that error appears in the above-identified patent and that said Letters Patent is hereby corrected as shown below:

On the Title Page
Item (57) ABSTRACT, change "may a" to --may be a--

On the Title Page 4
Item (56), change "Producting GaAs-based" to --Producible GaAs-based--
Item (56), change "CELO" to --CLEO--
Item (56), change "fo the SPIE," to --of the SPIE--

Column 2
Line 1, change "couple" to --coupler--

Column 3
Line 9, change "10" to --20--

Column 4
Line 51, change "11, has" to --11 and has--

Column 5
Line 4, change "form" to --from--

Signed and Sealed this

Thirteenth Day of July, 2010

David J. Kappos
*Director of the United States Patent and Trademark Office*